(12) United States Patent
Soma

(10) Patent No.: US 6,402,440 B2
(45) Date of Patent: Jun. 11, 2002

(54) TOOL ASSEMBLY

(75) Inventor: Takeshi Soma, Tokyo (JP)

(73) Assignee: Valenite Inc., Madison Heights, MI (US)

( * ) Notice: Subject to any disclaimer, the term of this patent is extended or adjusted under 35 U.S.C. 154(b) by 0 days.

(21) Appl. No.: 09/757,171

(22) Filed: Jan. 9, 2001

(30) Foreign Application Priority Data

Jan. 31, 2000 (JP) ........................................ 2000-021360

(51) Int. Cl.⁷ ............................................ B23B 29/034
(52) U.S. Cl. ........................ 408/154; 408/159; 408/180; 408/181
(58) Field of Search .................. 408/154, 156, 408/158, 159, 180, 181, 187, 153; 82/1.5

(56) References Cited

U.S. PATENT DOCUMENTS

| | | | | |
|---|---|---|---|---|
| 2,223,041 A | * | 11/1940 | Maxwell | 408/154 |
| 2,458,753 A | * | 1/1949 | Wallace | 408/180 |
| 2,495,583 A | * | 1/1950 | Heron | 408/180 |
| 2,716,360 A | * | 8/1955 | Cogsdill | 408/180 |
| 2,878,696 A | * | 3/1959 | Busch | 408/154 |
| 3,274,861 A | * | 9/1966 | Czuback | 408/180 |
| 3,606,561 A | * | 9/1971 | Davis | 408/146 |

FOREIGN PATENT DOCUMENTS

| | | | | |
|---|---|---|---|---|
| DE | 4022579 A1 | | 1/1991 | |
| DE | 19717835 A1 | | 10/1998 | |
| JP | 48-81189 | | 10/1973 | |
| JP | 1-101708 | | 7/1989 | |
| JP | 2539476 | | 6/1991 | |
| SU | 931325 A | * | 6/1982 | 408/159 |
| SU | 1144786 A | * | 3/1985 | 408/159 |

* cited by examiner

*Primary Examiner*—Daniel W. Howell
(74) *Attorney, Agent, or Firm*—John W. Gregg

(57) ABSTRACT

A tool assembly affording a wider range of adjustment of machining diameter, comprises a boring bar and a tool cartridge supporting a cutting tip and attached to the boring bar. The tool cartridge chassis is pivotably attached via a pin within a recess formed in boring bar; an adjustment screw is provided to a first side of the pivot axis, the screw being threaded into the cartridge chassis and situated in abutment with a surface of the bar. A compression spring is provided to a second side of the pivot axis, interposed between the boring bar and the cartridge chassis. Appreciable pivotal motion can be imparted to the cartridge chassis by loosening or tightening the adjustment screw. Adjustments can be made automatically by providing a draw-bar.

15 Claims, 2 Drawing Sheets

TOOL ASSEMBLY

FIELD OF THE INVENTION

The present invention relates to a tool assembly comprising a tool body such as a boring bar, and an adjustable machining tool cartridge attached thereto that provides improved adjustment of the cutting diameter of the tool assembly.

BACKGROUND OF THE INVENTION

A cutaway view of a conventional tool assembly is depicted in FIGS. 4 and 5. The cutting end of a boring bar 1 is illustrated, the other end of the boring bar being understood to be attached to the main shaft of a boring machine or CNC machine via a tapered shank or the like. Boring bar 1 is provided over an area thereof with a recess 3 having a flat side wall 5 and bottom wall 7.

A tool cartridge 9 comprises a cartridge chassis 11; the chassis is fixed to boring bar 1 by means of a clamping screw 15 threaded into a screw hole 13 formed in the boring bar. Into cartridge chassis 11 is threaded in the axial direction an adjustment screw 17; rotation of this screw in the extending direction fills the space between the cartridge chassis and the end wall 6 of the recess while at the same time supporting chassis 11 with strong force from the end wall.

Cartridge chassis 11 has a cutting tip 19 mounted thereto by a known method. Cartridge chassis 11 is provided, in proximity to the distal end thereof, with an adjustment screw 21 threaded into a screw hole in chassis 11, this adjustment screw being positioned so as to abut the side walls 5 of recess 3.

With this known design, advancing adjustment screw 21 causes cartridge chassis 11 to undergo elastic deformation whereby the outmost end of the cutting tip undergoes radial outward-directed displacement, allowing the machining diameter for the boring operation to be changed.

With the conventional tool cartridge 9 described above, since the machining diameter is changed via elastic deformation, the scope of adjustment thereof is naturally limited; typically, machining diameter can be adjusted between about 0.1 and 0.4 mm, with larger tool cartridges designed for greater elastic deformation giving a range of about 0.5 to 0.7 mm. Accordingly, there is a need for a tool cartridge affording a wider range of adjustment of machining diameter in order to meet dimensional requirements for various workpieces using an existing tool cartridge mounted on the boring bar or other similar tool.

SUMMARY OF THE INVENTION

The present invention is directed to a tool assembly comprising a tool body, for example a boring bar or the like, and a tool cartridge supporting a cutting tip and attached to the tool body that overcomes the limitations of the prior art and provides improved adjustment of cutting tip edge position. This invention may be beneficially used in mills, multiple action tools, boring bars and other tools known in the art.

An object of the present invention is to provide a tool assembly comprising a tool body, such as a boring bar, a tool cartridge having a chassis and supporting a cutting tip, a pivot secured to the tool body for engaging the tool cartridge, an adjustment means, and a spring means, wherein the tool cartridge chassis is pivotably attached to the tool body, the adjustment means is positioned to a first side of the pivot and in abutment with a surface of the tool body, and the spring means positioned on a second side of the pivot is interposed between the tool body and the chassis.

It is a further object of the invention to provide an adjustment means for transmitting force to a portion of the cartridge chassis so as to impart a radial outward-directed rotational force thereto positioned on a first side of the pivot and a spring means for imparting to the cartridge chassis a rotational force in the direction opposite the first rotational force positioned on a second side of the pivot. It is a further object that the adjustment means and the spring means allow fine adjustment of positioning of a cutting tip on the chassis through control of the chassis' rotation about the pivot.

A further object of the present invention is to provide a boring bar wherein the chassis of the tool cartridge is pivotably attached within a recess formed in the boring bar; an adjustment screw is provided to a first side of the pivot axis, being threaded into the cartridge chassis and situated in abutment with a surface of the cutting bar; and a tensioning device, such as a compression spring, is provided to a second side of the pivot axis, interposed between the boring bar and cartridge chassis. With this design, appreciable pivotal motion can be imparted to the cartridge chassis by loosening or tightening the adjustment screw, thereby providing a wider range of adjustment than the prior art.

Another object of the present invention is to provide a tool body, for example a boring bar wherein the chassis of the tool cartridge is pivotably attached within a recess formed in the boring bar and is actuated by a draw-bar. The draw-bar displaceable in the lengthwise direction is provided to the interior of the boring bar for adjusting tool cartridge position. This draw-bar is provided, to a first side of the pivot axis of the cartridge chassis, with a main cam action device for transmitting force to a portion of the cartridge chassis so as to impart radial outward-directed rotational force thereto; a tensioning device, such as a compression spring, for imparting to the cartridge chassis rotational force in the direction opposite the previous rotational force is provided to a second side of the pivot axis; and the pivoting position of the cartridge chassis is adjustable by means of adjustment of the longitudinal position of the draw-bar in relation to the boring bar. With this design, tool cartridge pivoting position can be adjusted automatically over a wide range. A further object of the invention is to provide a tensioning device, such as a compression spring, interposed between the boring bar and cartridge chassis, thus providing a simple design. A yet further object of the invention is fine adjustment of cartridge chassis pivoting position made via an adjustment means such as a screw, cam, wedge, and the like, whether mechanical, hydraulic or pneumatic.

Alternatively, another further object of the invention is to provide a compression spring interposed between the draw-bar and the cartridge chassis. The draw-bar includes an auxiliary cam action device whereby the degree of compression of the compression spring between the auxiliary cam action device and the cartridge chassis remains unchanged irrespective of the pivoting position of the cartridge chassis imparted by the main cam action device. Thus, the force produced by the compression spring remains constant regardless of the pivoting position of the cartridge chassis so that the degree of change in position of the cutting tip due to centrifugal force is unaffected by the pivoting position of the cartridge chassis.

A further object of the invention is to provide a follower rod provided between the main cam action device and the cartridge chassis; and an adjustment screw threaded into the cartridge chassis so as to abut the follower rod.

It is a yet further object of the invention to provide a boring bar wherein the recess is a groove formed coextensive with the lengthwise extension of the boring bar so as to have two side walls, and the cartridge chassis is pivotably supported by a pin supported on the two side walls. This arrangement provides reliable pivotal support.

DESCRIPTION OF THE PREFERRED EMBODIMENTS

A tool assembly pertaining to a first embodiment of the invention is depicted in FIGS. 1 and 2, and comprises a boring bar 31 and a tool cartridge 39. Boring bar 31 has a recess 33. In this embodiment, the recess takes the form of a groove with two side walls 35 for tightly accommodating tool cartridge 39, while allowing pivotal movement of the cartridge about a pivot axis. A pin 37 extends transversely through recess 33, and will be understood to be removably secured to the boring bar 31. The cartridge chassis 41 of the tool cartridge is provided with a hole through which the pin passes thereby movably attaching tool cartridge 39 to the boring bar.

Pin 37 fits the hole tightly so as to allow cartridge chassis 41 to pivot about pin 37 without play. That is, the fit of pin 37 in the hole is such that movement of the chassis in relation to the pin is substantially limited to rotation of the chassis about the pin. Cartridge chassis 41 has a curved rear edge 43 to facilitate pivoting and a distal edge 47 close to the terminal end 32 of the boring bar 31. In proximity to the distal edge 47 of cartridge chassis 41, adjustment screw 51 is threaded into a screw hole provided in the cartridge chassis. The distal end 52 of the adjustment screw 51 abuts a face of the boring bar 31. A cutting tip 49 is mounted on cartridge chassis 41 by a known method analogous to that in the prior art example. The tip is mounted in a depression 40 in the cartridge chassis 41. In a further embodiment, the cutting edge of the cutting tip is positioned substantially in the center across the width of recess 33.

Towards the rear of cartridge chassis 41, boring bar 31 is provided with a spring accommodating hole 53. A powerful compression spring 55 is accommodated within this hole so as to press down against the rear section 45 of the cartridge chassis. Alternatively, the spring accommodating hole may be provided in the cartridge chassis 41. In that case, a plate spring or the like is preferred so as to reduce the overall length of spring 55. Alternatively, other tensioning devices known in the art may be utilized. In any event, the compression spring is interposed between the rear section of the cartridge chassis and boring bar 31. With the arrangement described above, when adjustment screw 51 is loosened, that is withdrawn along the screw hole, tool cartridge 39 is energized by compression spring 55 and pivots in the clockwise direction, as viewed in FIG. 1, from the neutral position depicted in FIG. 1. Whereas, when the adjustment screw 51 is tightened, that is advanced along the screw hole, it causes the tool cartridge to pivot in the counterclockwise direction as viewed in FIG. 1, affording an extremely broad range of adjustment for the cutting edge of cutting tip 49. That is, loosening adjustment screw 51 adjusts cutting tip 49 inward creating a smaller boring radius, while tightening adjustment screw 51 adjusts cutting tip 49 outward creating a larger boring radius. The forces produced by the strong tensioning device and the adjustment screw afford support adequate to withstand machining resistance over the entire range of adjustment.

FIG. 3 depicts a tool assembly according to another embodiment of the invention, and comprises a boring bar 61 and a tool cartridge 69. According to the present embodiment displacement of the edge of the tip is carried out automatically. For this purpose a bore 59 coextensive with the center axis of boring bar 61 is provided, and a draw-bar 60 slidable in the lengthwise direction of the boring bar is provided within the bore 59. The draw-bar 60 is driven by a drive unit, not shown, under the control of the control unit of the boring machine in a manner for driving draw bars that is well known in the art.

Apart from the parts described below, the arrangement of tool cartridge 69 is basically the same as that depicted in FIGS. 1 and 2, so discussion of the parts that are the same is omitted here and the preceding description thereof in relation to FIGS. 1 & 2 is hereby incorporated by reference with regard to FIG. 3.

A radial hole 82 is provided in boring bar 61 at the location of adjustment screw 81, and a follower rod 83 is slidably arranged within this hole. Draw-bar 60 is provided with main cam action device 84. Moving draw-bar 60 in the lengthwise direction, with reference to the boring bar, causes the tool cartridge 69 to pivot about pin 67 allowing the radial position of the edge of the cutting tip to be changed.

A feature of the present embodiment is that the force produced by compression spring 73 remains unchanged regardless of the pivoting position of tool cartridge 69, thereby allowing better control of cutting edge position. It has been established that the position of the cutting tip edge during the machining operation is determined by the outward pushing force exerted on the adjustment screw 81 by the main cam action device 84, the force of the compression spring 73, the centrifugal force, and force directed radially inward from the workpiece; thus, any change in compression spring force can produce a change in cutting tip edge position. Allowing a change in spring force produces a change in the relationship between spring force and the tendency for tool cartridge 69 to pivot about pin 67 with centrifugal force produced as the boring bar turns, making accurate prediction of cutting tip edge position impossible. The problem of variable spring force is solved by means of the present embodiment wherein draw-bar 60 is provided with auxiliary cam action device 85 allowing radially inward movement of spring 73. Alternatively, other tensioning devices known in the art may be employed In FIG. 3, spring 73 takes the form of a stack of a plurality of plate springs accommodated within a spring accommodation hole 65 in tool cartridge 69. A spring retainer 89 having a follower rod 87 interposed between draw-bar 60 and spring 73. The profiles of the two cam action devices 84, 85 fulfill the following relationship.

$$D1:D2=L1:L2$$

where D1 is displacement of follower rod 83, D2 is displacement of follower rod 87 (D1 and D2 are mutually opposing directions), L1 is the distance from the center of pin 67 to adjustment screw 81, and L2 is distance from the center of pin 67 to of follower rod 87. Here, compression spring 73 is accommodated within tool cartridge 69, but where boring bar 61 has sufficient thickness, accommodation thereof within the boring bar is also possible.

Alternatively, compression spring 73 may be compressed between boring bar 61 and tool cartridge 69, as in the example depicted in FIG. 1. In this case, the force produced by the compression spring will change, although automatic adjustment of machining diameter will be afforded.

An advantage of the preceding embodiments is the ability to make fine adjustments via the adjustment screw 81;

however, automatic adjustment by the draw-bar 60 is not an essential element, it being possible for follower rod 83 to contact tool cartridge 69 directly.

According to the present embodiment, a portion of the mechanism for driving the tool cartridge 69 is accommodated within the boring bar 61, and as the mechanism consists simply of a draw-bar located in the center of the boring bar and a corresponding mechanism interposed between it and the tool cartridge, one or more additional elements identical to tool cartridge 69 or having designs based on the same principle may be provided. In FIG. 3, such an additional tool cartridge is denoted by symbol 91. While, tool cartridge 91 is shown diagrammatically, it will be readily understood that the cutting tip is arranged facing the direction of rotation of boring bar 61. It is also possible to provide two tool cartridges spaced apart in the diametrical or lengthwise direction or three or more thereof arranged at equidistant intervals in the circumferential direction.

By employing a plurality of tool cartridges in this way, fine cutting pitch can be achieved with larger boring bar feed. The positions of the edges of this plurality of tool cartridges can be adjusted via the common draw bar.

According to the present embodiment, edge position can be adjusted automatically over a wide range, allowing the workpiece to be rough finished to certain dimensions during the forward stroke of the boring bar and then precision finished to different dimensions during the return stroke. Where a plurality of tool cartridges is employed, the tool cartridge equipped with a cutting tip for precision finish machining can be moved into the desired radial position during the precision finish stroke. It is also possible to machine a hole to certain dimensions during the first stroke and to then machine a larger hole partway during the second stroke. In either case, the need to re-clamp the workpiece, such as is ordinarily required when subjecting a number of workpieces to a first operation and then again to a second operation, is obviated, preventing off-centering during the transition from the first operation to the second operation, so as to afford precision machining. Since there is no need to change tool cartridges, mispositioning is prevented and the need for a test operation after attaching a new cartridge, as with conventional tool cartridges, is obviated.

In FIG. 3, the position of the cutting tip of the additional tool cartridge 91 with respect to the lengthwise extension of boring bar 61 is shown as being the same as that of tool cartridge 69, but the invention is not limited to such an arrangement. The additional tool cartridge 91 may be arranged to the rear of tool cartridge 69. In this case, precision finish machining can be accomplished with the cutting tip of additional tool cartridge 91 while the cutting tip of tool cartridge 69 performs rough finish machining during the first forward stroke of boring bar 61. In this case it is not necessary for additional tool cartridge 91 to be identical to tool cartridge 69, and the profile of the draw-bar 60 cam action device for tool cartridge 91 can differ from that for tool cartridge 69.

Another mechanism for adjusting the radial position of the cutting tip via the draw-bar known in the art is placement of the member supporting the cutting tip in direct contact with the cam action device of the draw-bar to assure that it does not undergo displacement in the radial direction, thereby completely eliminating the possibility of fluctuation in machining dimension due to deformation of the compression spring 73 employed in the present invention (as in Registered Utility Model 25329476, for example); such a mechanism can be provided in such a way that the cutting tip supported thereby is located to the rear of the cutting tips of tool cartridges 69 and 91 of the present invention, and used for precision finish machining, while using tool cartridges 69 and 91 for rough finish machining exclusively. It this case, the profiles of the corresponding cam action devices for each cutting tip will be selected so as to allow the draw-bar to be used in common.

Figure 1:
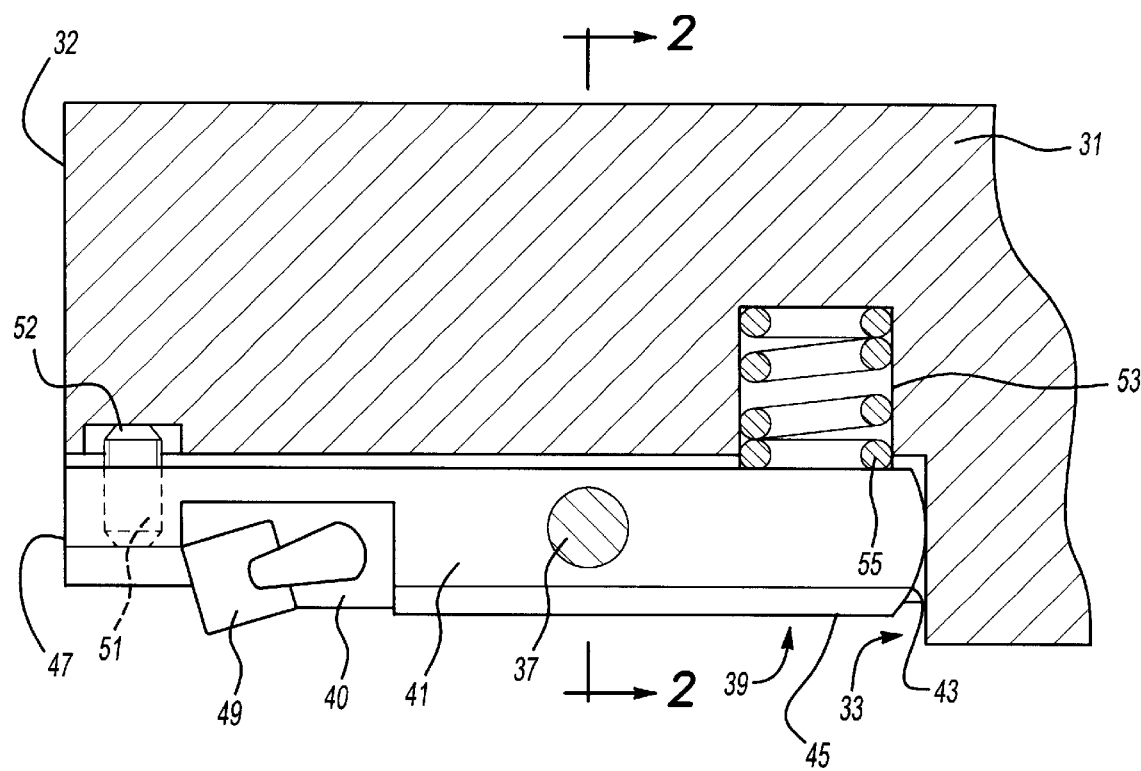
FIG. 1 is a sectional view of a tool assembly according to a first embodiment of the invention taken on line 1—1 in FIG. 2.
Figure 2:
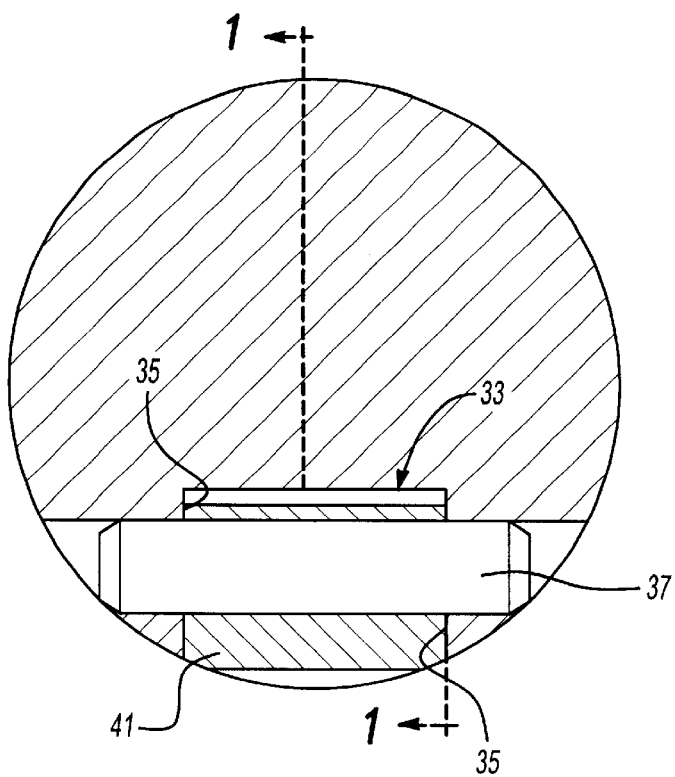
FIG. 2 is a sectional view of the tool assembly of FIG. 1 taken on line 2—2 in FIG. 1
Figure 3:
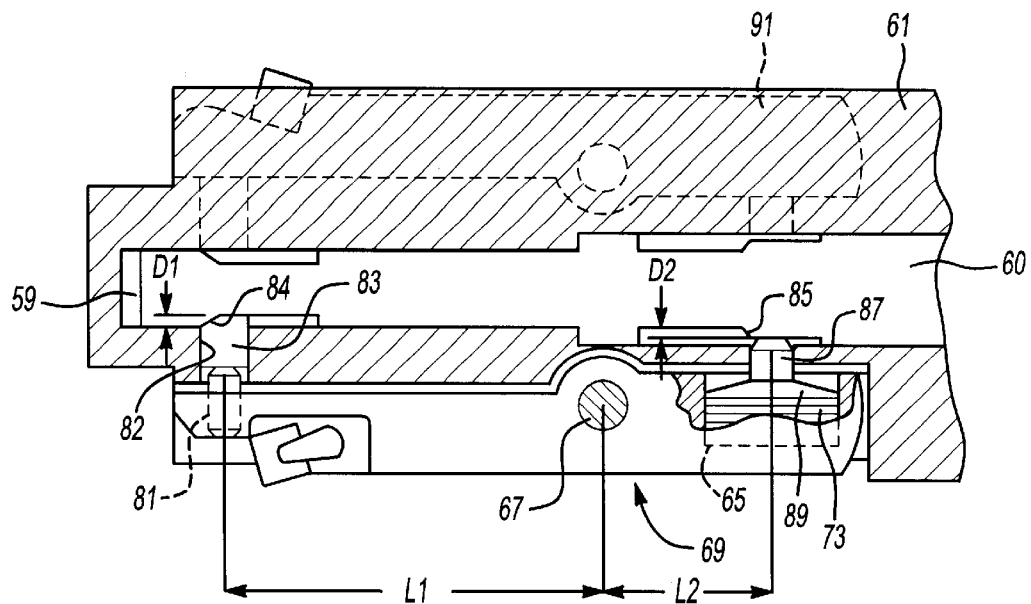
FIG. 3 is a sectional view of a tool assembly according to another embodiment of the invention showing a sectional view corresponding to FIG. 1.
Figure 4:
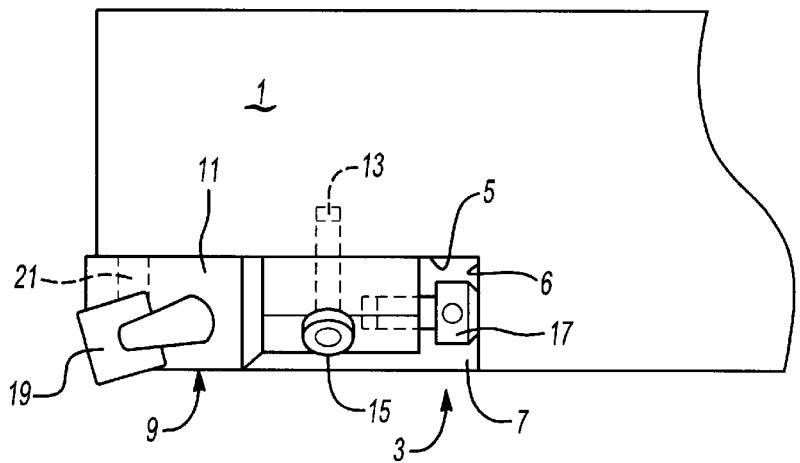
FIG. 4 is a top plan view of a tool assembly showing a tool cartridge according to the prior art.
Figure 5:
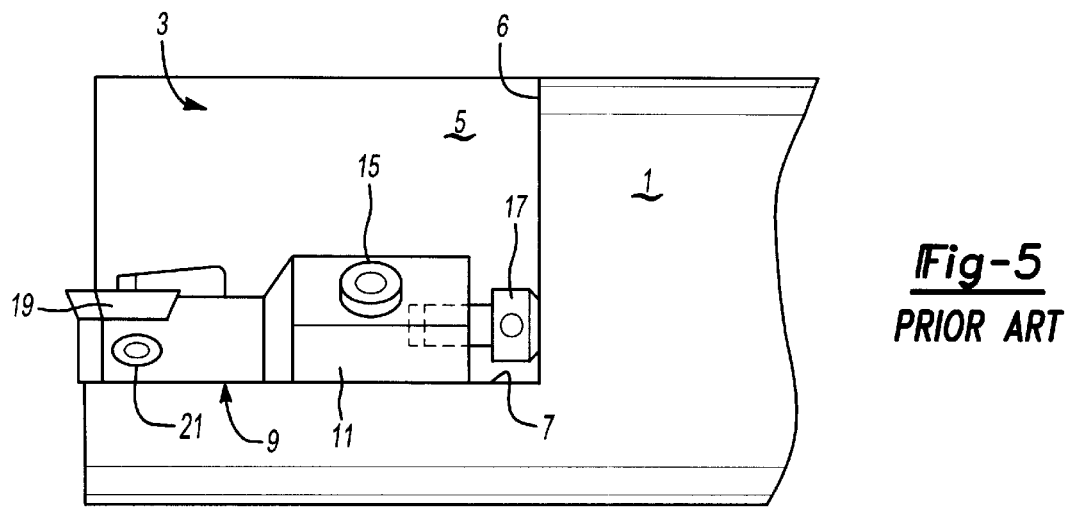
FIG. 5 is a side view of the prior art tool assembly of FIG. 4.

I claim:

1. A tool assembly comprising a boring bar, and a tool cartridge supporting a cutting tip and attached to the boring bar, the tool cartridge comprising a chassis pivotably attached within a recess formed in the boring bar and pivotable about a pivot axis, wherein an adjustment screw is provided to a first side of the pivot axis, the screw being threaded into the cartridge chassis and into abutment with a surface of the boring bar; and a tensioning device is provided to a second side of the pivot axis, interposed between the boring bar and cartridge chassis.

2. The tool assembly according to claim 1, wherein the recess is a groove formed coextensive with the lengthwise extension of the boring bar so as to have two side walls.

3. The tool assembly of claim 2 wherein the cartridge chassis is pivotable about a pin extending across the recess and secured to the two side walls.

4. An adjustable tool assembly comprising a tool body having a recess and tool cartridge having a chassis and supporting a cutting tip, the chassis being pivotably attached within the recess to the tool body, the tool assembly further comprising an adjustment screw for transmitting force to a portion of the cartridge chassis so as to impart a radial outward-directed first rotational force thereto, the adjustment screw positioned on the same side of the pivot as the cutting tip and a tensioning device for imparting to the cartridge chassis a second rotational force in the direction opposite the first rotational force, the tensioning device positioned on the side of the pivot opposite the cutting tip, whereby the adjustment screw allows fine adjustment of pivotal position of the cutting tip relative the tool body.

5. The adjustable tool assembly according to claim 4 further comprising a draw-bar displaceable in the lengthwise direction of the tool assembly, the draw-bar having a main cam action device for transmitting a radial outward-directed force through the adjustment screw.

6. A tool assembly comprising a boring bar and a tool cartridge supporting a cutting tip and attached to the boring bar, the tool cartridge comprising a chassis pivotably attached to the boring bar within a recess formed in the boring bar; wherein a draw-bar displaceable in the lengthwise direction is provided to the interior of the boring bar, the draw-bar being provided, to a first side of a pivot axis of the cartridge chassis, with a main cam action device for transmitting force to a portion of the cartridge chassis so as to impart a radial outward-directed first rotational force thereto;

a tensioning device for imparting to the cartridge chassis a second rotational force in the direction opposite the first rotational force provided to a second side of the pivot axis; the pivoting position of the cartridge chassis being adjustable by changing the longitudinal position of the draw-bar;

a follower rod provided between the main cam action device and the cartridge chassis; and an adjustment screw threaded into the cartridge chassis so as to abut the follower rod.

7. The tool assembly according to claim 6 wherein the tensioning device is provided interposed between the boring bar and cartridge chassis.

8. A tool assembly comprising a boring bar and a tool cartridge supporting a cutting tip and attached to the boring bar, the tool cartridge comprising a chassis pivotably attached to the boring bar within a recess formed in the boring bar; wherein a draw-bar displaceable in the lengthwise direction is provided to the interior of the boring bar, the draw-bar being provided, to a first side of a pivot axis of the cartridge chassis, with a main cam action device for transmitting force to a portion of the cartridge chassis so as to impart a radial outward-directed first rotational force thereto;

a tensioning device for imparting to the cartridge chassis a second rotational force in the direction opposite the first rotational force provided to a second side of the pivot axis; the pivoting position of the cartridge chassis being adjustable by changing the longitudinal position of the draw-bar; and the draw-bar is provided with an auxiliary cam action device whereby the degree of compression of the tensioning device remains unchanged irrespective of the pivoting position of the cartridge chassis imparted by the main cam action device.

9. The tool assembly according to claim 8, wherein the tensioning device is interposed between the boring bar and cartridge chassis.

10. The tool assembly according to claim 6, wherein the tensioning device is provided interposed between the draw-bar and the cartridge chassis; and the draw-bar is provided with an auxiliary cam action device whereby the degree of compression of the tensioning device between the auxiliary cam action device and the cartridge chassis remains unchanged irrespective of the pivoting position of the cartridge chassis imparted by the main cam action device.

11. The tool assembly according to claim 6, wherein the recess is a groove formed coextensive with the lengthwise extension of the boring bar so as to have two side walls; the cartridge chassis being pivotally supported by a pin supported on the two side walls.

12. The tool assembly according to claim 7, wherein the recess is a groove formed coextensive with the lengthwise extension of the boring bar so as to have two side walls; the cartridge chassis being pivotally supported by a pin supported on the two side walls.

13. The adjustable tool assembly according to claim 5 wherein the draw bar further comprises an auxiliary cam action device whereby the degree of compression of the tensioning device remains unchanged irrespective of the pivoting position of the cartridge chassis imparted by the main cam action device.

14. The tool assembly according to claim 8, wherein the recess is a groove formed coextensive with the lengthwise extension of the boring bar so as to have two side walls; the cartridge chassis being pivotably supported by a pin supported on the two side walls.

15. A tool assembly comprising a tool body, and a tool cartridge supporting a cutting tip and attached to the tool body, the tool cartridge comprising a chassis pivotably attached within a recess formed in the tool body and pivotable about a pivot axis, wherein an adjustment screw is provided to a first side of the pivot axis, the screw being threaded into the cartridge chassis and into abutment with a surface of the tool body; and a tensioning device is provided to a second side of the pivot axis, interposed between the tool body and the cartridge chassis.

* * * * *